Jan. 2, 1934.          J. DIETRICH          1,942,088
ADJUSTABLE STRUT FOR STAGINGS
Filed Aug. 31, 1933
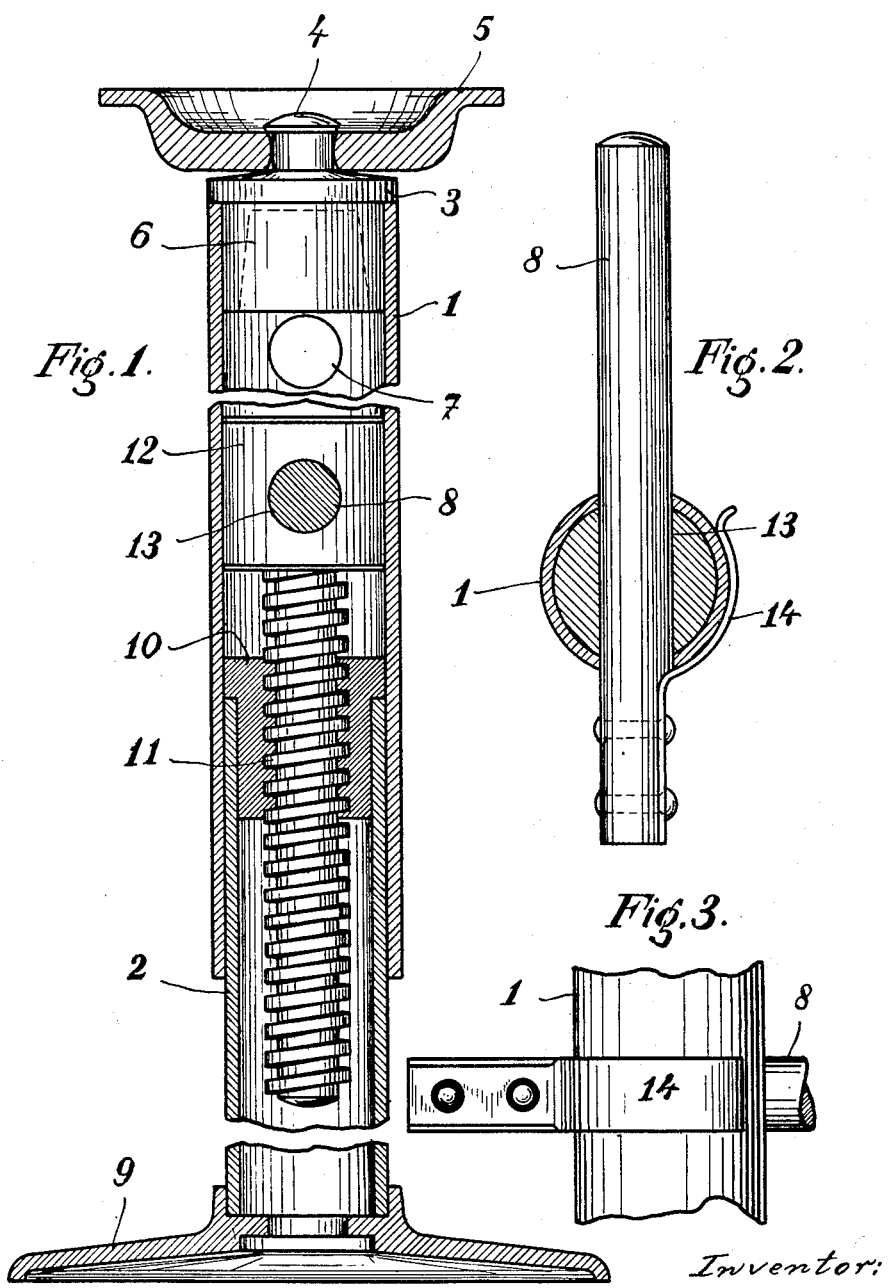

Patented Jan. 2, 1934

1,942,088

UNITED STATES PATENT OFFICE 1,942,088

ADJUSTABLE STRUT FOR STAGINGS

Jakob Dietrich, Dietlikon, Switzerland, assignor to the firm E. Krebs & Co., Dietlikon, Switzerland Application August 31, 1933, Serial No. 687,692, and in Switzerland September 5, 1932

2 Claims. (Cl. 254—98)

The present invention relates to an adjustable strut for stagings formed of two telescoping pipes. The outer pipe constitutes its upper and the inner pipe the lower part of the strut. The upper pipe is provided with a turning and pivoted top-plate and with a series of through-holes arranged at equal distances from one another, while the lower pipe is fast to a pedestal-plate and has a nut inserted fast into its top end inside of the upper pipe, a screw with a perforated head being fitted into said nut and coupled to the upper pipe by means of a cross-pin stuck through one of the holes of the upper pipe and the perforation of the screwhead, this pin serving as a handle for adjusting the upper to the lower pipe by a number of turns given to the upper pipe.

A great number of adjustable struts have been proposed heretofore but none of them has given entire satisfaction partly because the screw was too much exposed to injuries, partly because the simplicity or the solidity of the construction was lacking.

The annexed drawing represents one working form of a strut according to the present invention.

The Fig. 1 is a longitudinal section showing the general arrangement,

The Fig. 2 a cross-section at the height of the handle and

The Fig. 3 a side view of the handle.

Of the two pipes 1 and 2, the latter is telescoped into the first. The outer pipe 1 has a cap 6 formed as a pivot plate 3 pressed fast into its upper end, a turning top-plate 5 being held by the pivot 4 besides there are a series of through-holes as 7 provided in said pipe. The inner pipe 2 is secured fast to a base-plate 9 and carries a nut 10 secured fast into its upper end. A screw 11 screwed into said nut is slidably fitted with its perforated head 12 into the inside of the upper pipe and is coupled thereto by means of a cross-pin 8 stuck through the said perforation 13 and through one of the holes 7 of the upper pipe 1.

The pin 8 projects with one end far enough from the hole 13 to serve as a handle and with its other end to carry a flat spring riveted thereto and embracing with a bent portion 14 one half-side of the pipe. By turning the handle 8 in one or the other sense the upper pipe will be turned together with the screw and be lowered or raised with regard to the lower pipe so that both pipes together form an adjustable strut.

The advantage of this form of a strut reposes in the fact which has been proved by comparative experiments that the breaking strain of such a strut is very near the same as that of the outer pipe, that the screw threads are protected against all deformation and obstruction by sand and dust and that it is easily manufactured and handled.

In using the described adjustable strut the holes in the upper pipe will be very useful for making any required large adjustments, while the adjusting screw will be quite sufficient for the small adjustments.

What I claim is:

1. In an adjustable staging strut formed of two telescoped pipe ends in combination, the inner pipe formed as the lower portion of the strut with a base-plate and an inner nut secured fast into its top end, the outer pipe carrying a pivoted turning head-plate and provided with a series of through holes arranged at equal distances from one another, an adjusting screw screwed into said nut and fitted with its perforated head into the inside of the upper pipe, and an outwardly projecting cross-pin stuck through one of the holes of the upper pipe and the perforation of the adjusting screw head and serving as a handle for adjusting the upper pipe to the lower.

2. In an adjustable staging strut formed of two telescoped pipe ends in combination, the inner pipe formed as the lower portion of the strut with a base-plate and an inner nut secured fast into its top end, the outer pipe carrying a pivoted turning head-plate and provided with a series of through holes arranged at equal distances from one another, an adjusting screw screwed into said nut and fitted with its perforated head into the inside of the upper pipe, an outwardly projecting cross-pin stuck through one of the holes of the upper pipe and the perforation of the adjusting screw head and serving with one of its projecting ends as a handle for adjusting the upper pipe to the lower and a flat spring riveted to the other projecting end of the cross-pin and embracing with a bent portion one half side of the upper pipe to prevent the pin from getting lost.

JAKOB DIETRICH.